(12) United States Patent  
Griffin et al.

(10) Patent No.: US 9,055,154 B2  
(45) Date of Patent: *Jun. 9, 2015

(54) MOBILE COMMUNICATION DEVICE WITH SUBSCRIBER IDENTITY MODULE

(71) Applicant: BlackBerry Limited, Waterloo (CA)

(72) Inventors: Jason Tyler Griffin, Waterloo (CA); Mihal Lazaridis, Waterloo (CA); Christopher Pattenden, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/453,075

(22) Filed: Aug. 6, 2014

(65) Prior Publication Data

US 2014/0349706 A1 Nov. 27, 2014

Related U.S. Application Data

(63) Continuation of application No. 12/940,217, filed on Nov. 5, 2010, now Pat. No. 8,831,676.

(51) Int. Cl.
*H04M 1/00* (2006.01)
*H04M 3/54* (2006.01)
(Continued)

(52) U.S. Cl.
CPC ............... *H04M 3/54* (2013.01); *H04W 8/205* (2013.01); *H04W 88/04* (2013.01); *H04W 88/06* (2013.01); *H04B 1/3816* (2013.01); *H04W 4/008* (2013.01); *H04W 40/02* (2013.01); *H04B 7/26* (2013.01)

(58) Field of Classification Search
CPC .... H04M 1/7253; H04W 88/04; H04W 88/02
USPC .............. 455/552.1, 456.3, 456.1, 11.1, 41.1, 455/41.2, 500, 507, 553.1, 556.1, 558, 559
See application file for complete search history.

(56) References Cited

U.S. PATENT DOCUMENTS 6,134,437 A   10/2000  Karabinis et al.
6,339,706 B1   1/2002  Tillgren
(Continued)

FOREIGN PATENT DOCUMENTS

EP         2451132         5/2012
EP         2503758         9/2012
(Continued)

OTHER PUBLICATIONS

European Search Report mailed Feb. 27, 2013 for European Application No. 12172901.6, pp. 1-8.
(Continued)

*Primary Examiner* — Nathan Mitchell
(74) *Attorney, Agent, or Firm* — Donna Flores, Esq.; CRGO Law (57) ABSTRACT

In one embodiment, a method of directing calls on a mobile communication device comprises receiving a call signal at the mobile communication device from a short-range enabled communication device operably connected with the mobile communication device, accessing subscriber identity module data of the short-range enabled communication device, preparing an outgoing call signal using the accessed subscriber identity module data of the short-range enabled communication device, establishing a communication session between the short-range enabled communication device and a network, and transmitting the outgoing call signal to the network.

20 Claims, 7 Drawing Sheets

(51) Int. Cl.
*H04W 8/20* (2009.01)
*H04W 88/04* (2009.01)
*H04W 88/06* (2009.01)
*H04W 4/00* (2009.01)
*H04W 40/02* (2009.01)
*H04B 7/26* (2006.01)

(56) References Cited

U.S. PATENT DOCUMENTS

| | | | |
|---|---|---|---|
| 7,869,792 B1 | 1/2011 | Zhou et al. | |
| 8,831,676 B2 * | 9/2014 | Griffin et al. | 455/552.1 |
| 8,838,087 B1 * | 9/2014 | Delker et al. | 455/419 |
| 8,843,122 B1 * | 9/2014 | Wick et al. | 455/418 |
| 2001/0041552 A1 | 11/2001 | Wingren | |
| 2002/0085511 A1 | 7/2002 | Koponen et al. | |
| 2004/0264413 A1 | 12/2004 | Kaidar et al. | |
| 2006/0148533 A1 | 7/2006 | Tanneberger et al. | |
| 2007/0004457 A1 | 1/2007 | Han | |
| 2008/0081611 A1 | 4/2008 | Hoyt | |
| 2008/0201765 A1 | 8/2008 | Walter | |
| 2008/0254833 A1 | 10/2008 | Keevill | |
| 2008/0261528 A1 | 10/2008 | Rosenblatt | |
| 2008/0261529 A1 | 10/2008 | Rosenblatt | |
| 2010/0234051 A1 | 9/2010 | Holden et al. | |

FOREIGN PATENT DOCUMENTS

| | | |
|---|---|---|
| GB | 2363291 | 12/2001 |
| WO | 98/57444 | 12/1998 |
| WO | 9857444 | 12/1998 |
| WO | 2005046185 | 5/2005 |
| WO | 2005104575 | 11/2005 |
| WO | 2012058773 | 5/2012 |

OTHER PUBLICATIONS

EPO Communication under Rule 71(3) EPC for European Application No. 10190275, Jan. 21, 2013, pp. 1-7.
Notice of Publication of Application for U.S. Appl. No. 13/590,268, Dec. 13, 2012, p. 1.
Notice of Publication of Application for U.S. Appl. No. 13/590,288, Dec. 13, 2012, p. 1.
Office Action for U.S. Appl. No. 13/590,288, Dec. 12, 2012, p. 1-8.
Office Action for U.S. Appl. No. 13/590,268, Dec. 13, 2012, pp. 1-7.
European Examiner's Search Report and Written Opinion for International Application No. PCT/CA2011/050663, Jan. 19, 2012, pp. 1-12.
Extended European Search Report for European Application No. 10190275.7, Apr. 8, 2011, pp. 1-9.
3GPP TSG SA WG3 Security—S3#29, SIM Access Via 'SIM Access Profile' and Bluetooth Link, vol. SA WG#, #28, San Francisco, CA, Jul. 15, 2003, pp. 1-8.

* cited by examiner

MOBILE COMMUNICATION DEVICE WITH SUBSCRIBER IDENTITY MODULE

CROSS REFERENCE TO RELATED APPLICATIONS

This application is a Continuation of U.S. patent application Ser. No. 12/940,217, entitled Mobile Communication Device with Subscriber Identity Module, filed Nov. 5, 2010, which is incorporated herein in its entirety.

FIELD OF THE DISCLOSURE

The present disclosure relates to wireless telecommunications, and more particularly, without any limitation to the use of subscriber identity profiles on short-range enabled communication devices.

BACKGROUND OF THE DISCLOSURE

Mobile communication devices generally require some capability to connect with a wide area wireless network, such as a cellular telecommunications network, etc. in order to effectuate communication. Some mobile communication devices have a subscriber identity module or similar component for identifying the subscriber using the communication device to a wireless network. Typically, a communication subsystem having one or more transceivers and related circuitry within the mobile communication device enables radio communication between the mobile communication device and a wireless network.

Traditionally, a mobile communication device may be associated with only one subscriber and one subscriber identity. However, it is increasingly common for mobile device users to need more than one mobile subscriber account; for example, one account for business use and one account for personal use. It is, however, inconvenient for a user desiring to have separate subscriber accounts to own and manage two or more separate fully functional mobile communication devices.

BRIEF DESCRIPTION OF THE DRAWINGS

A more complete understanding of the embodiments of the present patent disclosure may be had by reference to the following Detailed Description when taken in conjunction with the accompanying drawings wherein.

DETAILED DESCRIPTION OF THE DRAWINGS

The present patent disclosure is broadly directed to utilizing subscriber identity profile access capabilities in conjunction with short-range communication technology to enable a short-range enabled communication device having a subscriber identity module (SIM) associated therewith to utilize network connection capabilities of an associated mobile communication device. An equivalent of a SIM is called a Universal Integrated Circuit Card (UICC), which runs a UMTS SIM (USIM) application, while a Removable User Identity Module (R-UIM) is more popular in CDMA-based devices. An IP Multimedia Services Identity Module (ISIM) is an application running on a UICC smart card. For example the ISIM contains the IP Multimedia Private Identity (IMPI), usable when obtaining services from the IP Multimedia Subsystem (IMS). The disclosure also relates to at least one short-range enabled "slave" communication device having a SIM profile incorporated thereon to utilize network connection capabilities of a "master" mobile communication device that may have a separate SIM profile. The slave and master may also originate and receive calls associated with either the SIM profile associated with the slave or the SIM profile associated with the master interchangeably utilizing SIM Access Profile protocols and various user-selectable options. Accordingly, a user is able to maintain at least two separate accounts, each account tied to a separate device with only one device needing full network communication capabilities. By enabling the slave to utilize the wide area network communication capabilities of the master and enabling both the master and slave to access the SIM profiles for both devices, a user desiring two or more separate accounts and separate physical devices is able to purchase and maintain at least one device which can be smaller and less complex as compared to traditional communication devices having elaborate RF transceiver circuitry and power supply systems. The user is also able to both originate and terminate calls and/or data transmissions on either the slave or master device without having to physically access both devices.

In one aspect, an embodiment of a mobile communication network comprises a mobile communication device ("master") having wireless network communication capabilities thereon and a short-range enabled communication device ("slave") comprising a SIM card and profile but without wireless network communication capabilities thereon. The slave device is connected via short-range communication technology with the master device. The master device comprises a manager component operable to facilitate a communication session between the slave device and the wireless network using the network capabilities of the master device and data from the subscriber identity module of the slave device.

In another embodiment, a mobile communication device comprises a communication subsystem operable for communicating with a wireless network, a short-range communication subsystem operable for communicating with a short-range enabled communication device having a subscriber identity module (SIM), and a manager component operable for accessing data from the SIM of the short-range enabled communication device and facilitating a communication session between the wireless network and the short-range enabled communication device using the communication system, short-range communication system, and accessed data from the SIM of the short-range enabled communication device.

In another aspect, a short-range enabled communication device comprises a SIM for identifying a subscriber of the short-range enabled communication device to a wireless network, a short-range communication system operable to communicate with a mobile communication device, the mobile communication device having transceiver circuitry for communication with the wireless network, and a processor component adapted to facilitate a SIM access session between the mobile communication device and the short-range enabled communication device for extraction of data from the SIM of the short-range enabled communication device during a communication session with the wireless network.

In still another aspect, a method of directing calls on a mobile communication device comprises receiving a call at the mobile communication device, determining that the received call is directed to a SIM associated with a short-range enabled communication device, and transmitting the received call to the short-range enabled communication device.

In yet another aspect, a method of directing calls on a mobile communication device comprises receiving a call signal at the mobile communication device from a short-range enabled communication device operably connected with the mobile communication device, accessing SIM data of the short-range enabled communication device, preparing an outgoing call signal using the accessed SIM data of the short-range enabled communication device, establishing a communication session between the short-range enabled communication device and a network, and transmitting the outgoing call signal to the network.

A system and method of the present patent disclosure will now be described with reference to various examples of how the embodiments can be made and used. Like reference numerals are used throughout the description and several views of the drawings to indicate like or corresponding parts, wherein the various elements are not necessarily drawn to scale.

Figure 1:
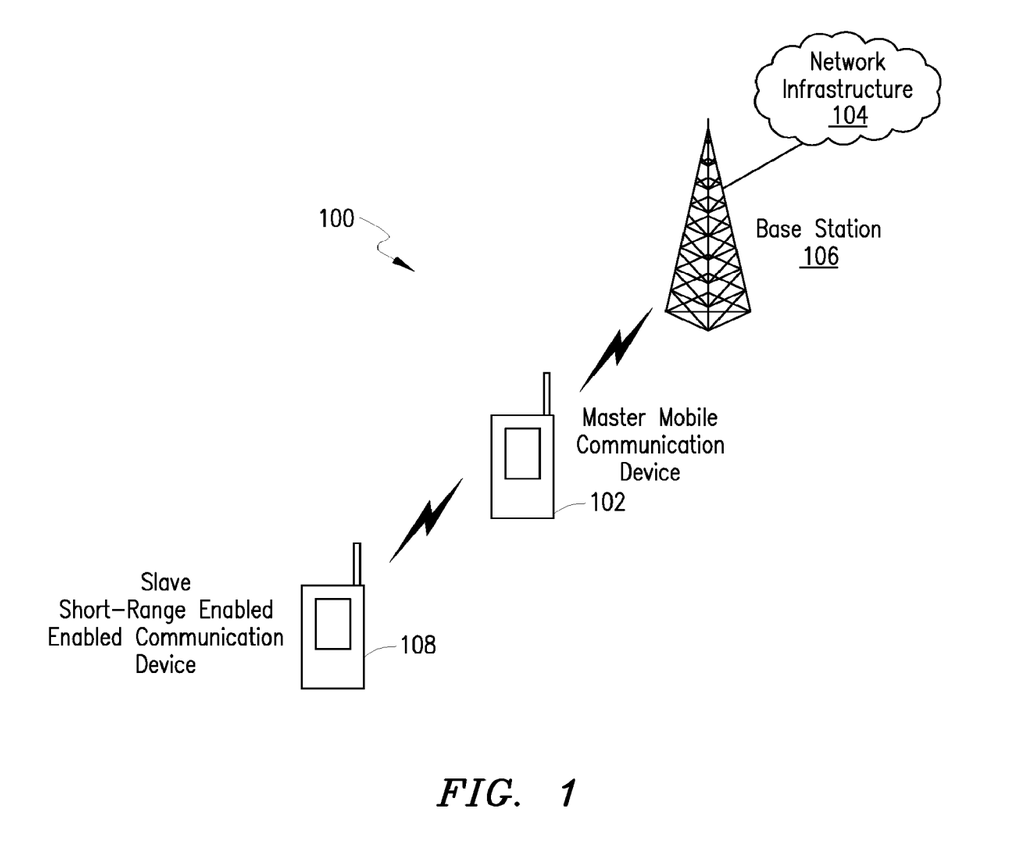
FIG. 1 is a diagram illustrating a network environment in which a master mobile communication device and a slave short-range enabled communication device may communicate within a wireless network according to one embodiment of the present disclosure.

Referring now to the drawings, and more particularly to FIG. 1, there is shown an exemplary network environment 100 wherein an embodiment of the present disclosure may be practiced. A master mobile communication device 102 (hereinafter "master") may communicate with a network infrastructure 104 through base station 106. A user of master 102 may further desire an additional communication device such as slave short-range enabled communication device 108 (hereinafter "slave"). Master 102 may comprise any portable computer (e.g., laptops, palmtops, or handheld computing devices) or a mobile communications device (e.g., cellular phones or data-enabled handheld devices capable of receiving and sending messages, web browsing, et cetera), or any enhanced personal digital assistant (PDA) device or integrated information appliance capable of email, video mail, Internet access, corporate data access, messaging, calendaring and scheduling, information management, and the like, that may be operable in one or more modes of operation. Slave 108 is operably connected to master 102 by short-range communication technology such as BLUETOOTH® or any other suitable short-range technology that can be implemented for purposes of the present patent disclosure. Slave 108 may comprise a subscriber identity profile separate and distinct from a subscriber identity profile assigned to master 102, thereby enabling a user of both master 102 and slave 108 to maintain separate accounts with a network operating within the network infrastructure 104.

The network infrastructure 104 may comprise three broad categories of communication spaces capable of providing service to master 102. There may exist any number of Public Land Mobile Networks (PLMNs) that are operable to provide cellular telephony services which may or may not include packet-switched data services. Depending on the coverage area(s) and whether the user is roaming, the network infrastructure 104 can include a number of cellular RANs, associated home networks (i.e., home PLMNs or HPLMNs) and visited networks (i.e., VPLMNs), each with appropriate infrastructure such as Home Location Register (HLR) nodes, Mobile Switching Center (MSC) nodes, and the like. Since the network infrastructure 104 may also include a General Packet Radio Service (GPRS) network that provides a packet radio access for mobile devices using the cellular infrastructure of a Global System for Mobile Communications (GSM)-based carrier network, one or more Serving GPRS Support Nodes (SGSNs) may be incorporated therein. Alternatively, the network infrastructure 104 may include an Evolved Packet System (EPS) network that provides a packet radio access for mobile devices using a cellular infrastructure, one or more eNBs (Evolved Node B(asestation)s), MMES (Mobility Management Entities), SGWs_(Service Gateways) and PGWs (Packet Data Network (PDN) Gateways) may be incorporated therein. In the present disclosure and without loss of generality, the functionality provided by the node named SGSN in the GPRS is assumed to be substantially provided by the node named MME and the node named S-GW in the EPS. A device can register for EPS services and non-EPS services using the EPS. If a device using EPS registers for non-EPS services, the mobile device can use the MSC. Additionally, by way of generalization, the PLMNs of the network infrastructure 104 may comprise networks such as one or more Enhanced Data Rates for GSM Evolution (EDGE) networks, Integrated Digital Enhanced Networks (IDENs), Code Division Multiple Access (CDMA) networks, Universal Mobile Telecommunications System (UMTS) networks, Universal Terrestrial Radio Access Networks (UTRANs), Evolved UTRAN (E-UTRAN), or any 3rd Generation Partnership Project (3GPP)-compliant network (e.g., 3GPP or 3GPP2), or Long Term Evolution (LTE) network, all operating with well known frequency bandwidths and protocols. The PS networks may indicate that voice media or CS media are supported. A mobile device such as master 102 connecting to the system using a PS network (for example the E-UTRAN network) need not use voice services using the PS network if one or more indicators indicate voice media or CS media are not supported by the PS network. Alternatively, if an indicator, indicating voice media or CS media are supported, is substantially absent, the mobile device need not use voice services using the PS network.

Figure 2:
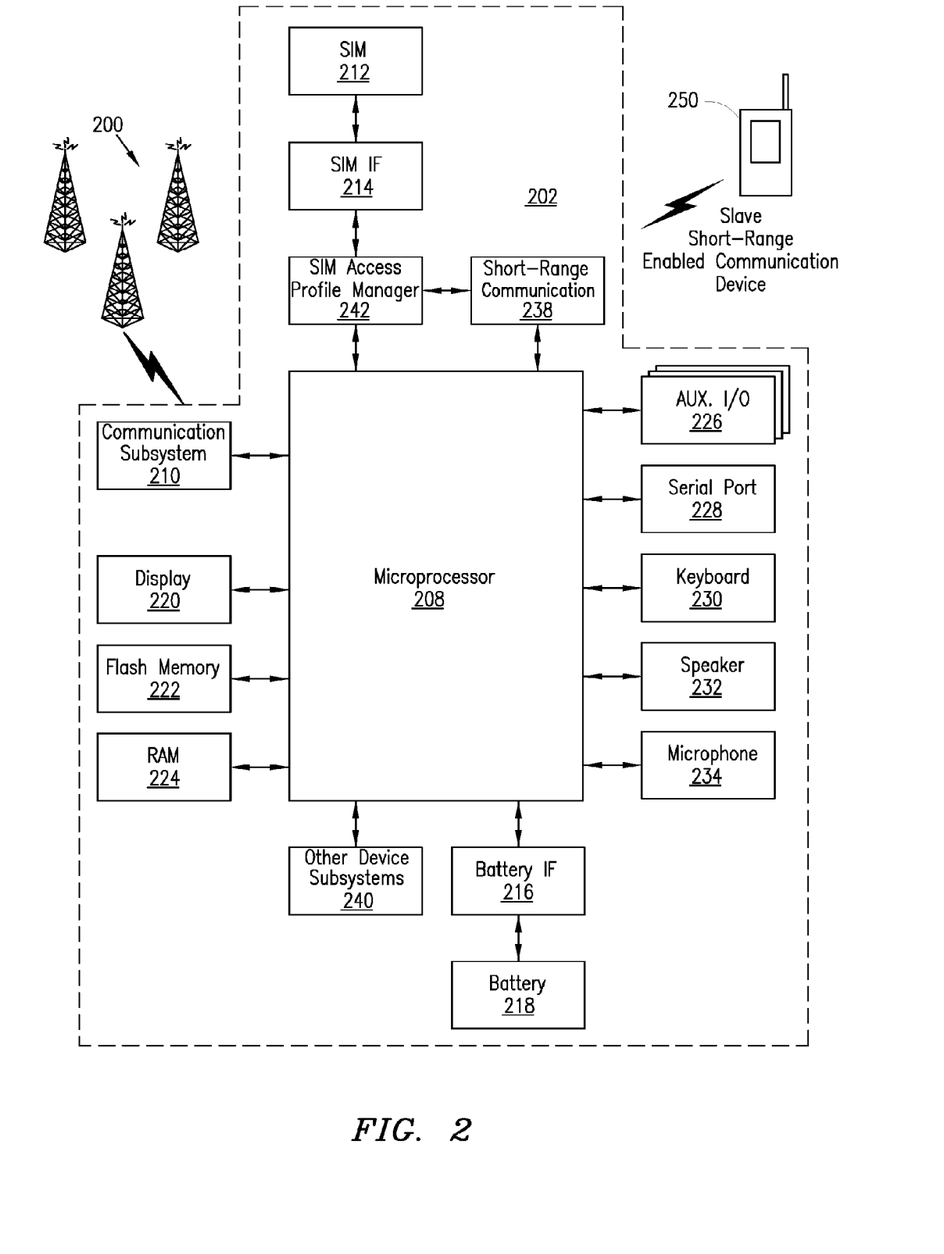
FIG. 2 is a diagram illustrating components of a master mobile communication device according to one embodiment of the disclosure.

FIG. 2 is a block diagram of a master mobile communication device 202 which may be used according to one embodiment of the present disclosure. Master 202 may be a two-way communication device having at least voice and/or advanced data communication capabilities, including the capability to communicate with other computer systems. Depending on the functionality provided by master 202, it may be referred to as a user equipment (UE), data messaging device, a two-way pager, a cellular telephone with data messaging capabilities, a wireless Internet appliance, or a data communication device (with or without telephony capabilities). Master 202 may communicate with a network infrastructure such as network infrastructure 104 shown in FIG. 1 through any one of a plurality of base stations 200 within a geographic coverage area.

Master 202 includes a communication subsystem 210, which typically comprises a receiver, a transmitter, and associated components, such as one or more antenna elements (embedded or internal), local oscillators (LOs), and a processing module such as a digital signal processor (DSP) (all not shown). In general, communication subsystem 210 may be seen as comprising radio frequency (RF) transceiver circuitry and one or more antennas appropriate for effectuating wide area cellular communications in one or more bands, frequencies, and radio access technologies. Accordingly, it will be apparent to those skilled in art that communication subsystem 210 will be adapted to particular wireless network or networks in which master 202 is intended to operate.

In certain embodiments, network access is generally associated with a subscriber or user of master 202 and therefore master 202 may operate using a Subscriber Identity Module (SIM) 212 which is connected to or inserted in master 202 at a SIM interface (IF) 214. SIM 212 is one type of a conventional "smart card" used by master 202 to personalize the device, among other things. In one embodiment, without SIM 212, master 202 may not be fully operational for communication through the wireless network. By inserting SIM 212 into master 202, an end user can have access to any and all of his/her subscribed services. SIM 212 generally includes a processor and memory for storing information. Since SIM 212 is coupled via SIM IF 214, it is accessible to microprocessor 208. In order to identify the subscriber, SIM 212 contains subscriber identity information parameters such as an International Mobile Subscriber Identity (IMSI) or similar device identifier(s) and/or subscriber identifier(s) such as, e.g., International Mobile station Equipment Identity (IMEI) parameters, Electronic Serial Number (ESN) parameters, Mobile Identification Number (MIN) parameters, et cetera, that are associated with mobile communication devices depending on the wireless network technologies and protocols. SIM 212 may store additional user information for master 202 as well, including datebook (or calendar) information and recent call information. It should be understood that master 202 may also utilize alternative user identity modules such as a Universal Integrated Circuit Card (UICC) or a Removable User Identity Module (R-UIM) card, or other suitable user identity "smart card" known to those skilled in the art for purposes of the present patent application.

Master 202 is generally a battery-powered device and therefore includes a battery IF 216 for receiving one or more rechargeable batteries 218. Such a battery 218 provides electrical power to most if not all electrical circuitry in master 202, and battery IF 216 provides for a mechanical and electrical connection for battery 218. The battery IF 216 is coupled to a regulator (not shown) which provides power to all of the circuitry.

Microprocessor 208 controls overall operation of master 202 whereas communication functions, including at least data and voice communication, are performed through communication subsystem 210. Microprocessor 208 also interacts with additional device subsystems such as a display 220, a flash memory 222, a random access memory (RAM) 224, auxiliary input/output (I/O) subsystems 226, a serial port 228, a keyboard 230, a speaker 232, a microphone 234, a short-range communication subsystem 238, and any other device subsystems generally designated at 240.

Some of the subsystems shown in FIG. 2 perform communication-related functions, whereas other subsystems may provide "resident" or on-device functions. Notably, some subsystems, such as keyboard 230 and display 220, for example, may be used for both communication-related functions, such as entering a text message for transmission over a communication network, and device-resident functions such as a calculator or task list. Accordingly, microprocessor 208 interfaces with device display 220 to display received information, stored information, user inputs, and the like. Keyboard 230, which may be a telephone type keypad or full alphanumeric keyboard, is normally provided for entering data for storage in master 202, information for transmission to a network, a telephone number to place a telephone call, commands to be executed on master 202, and possibly other or different user inputs.

Operating system software used by microprocessor 208 may be stored in a persistent store such as flash memory 222, which may alternatively be a read-only memory (ROM) or similar storage element (not shown). Those skilled in the art will appreciate that the operating system, specific device applications, or parts thereof, may be temporarily loaded into a volatile store such as RAM 224.

Additional applications may also be loaded onto master 202 through the auxiliary I/O subsystem 226, serial port 228, short-range communication subsystem 238, or any other suitable subsystem 240, and installed by a user in RAM 224 or a non-volatile memory (not shown) for execution by microprocessor 208. Such flexibility in application installation increases the functionality of master 202 and may provide enhanced on-device functions, communication-related functions, or both. For example, secure communication applications may enable electronic commerce functions and other such financial transactions to be performed using master 202.

A SIM Access Profile Manager 242 is operable to control and manage SIM 212. SIM Access Profile Manager 242 enables master to manage and modulate between a SIM profile according to SIM 212 and a SIM profile associated with another device operably connected with master 202 such as slave 108 shown in FIG. 1. Accordingly, a slave short-range enabled communication device 250 similar to slave 108 shown in FIG. 1 may be operably connected and communicate with the master 202 via the short-range communication subsystem 238. As will be set forth in detail below, slave 250 may also communicate with a network infrastructure utilizing the communication subsystem 210 of master 202.

Accordingly, communication subsystem 210 may comprise multiple RF transceivers therein, each transceiver adapted to effectuate wide area cellular communications for each SIM operably connected with master 202. For example, communication subsystem may comprise a first RF transceiver adapted for communication based on the contents of SIM 212 and a second RF transceiver adapted for communication based on the contents of the SIM (not shown) of slave 250. One skilled in the art will recognize that each RF transceiver may operate in radio access technologies such as CDMA, UMTS, EDGE, TDMA, and GPRS, etc.

The SIM Access Profile Manager 242 is operable to communicate with and access data for one or more SIMs of one or more slaves operably connected with master such as a SIM (not shown) of slave 250. The SIM Access Profile Manager 242 is further operable to initiate, maintain, and terminate SIM access sessions accordingly. SIM Access Profile Manager 242 enables the master 202 to facilitate communication between slave 250 and a wireless network. As alluded to previously, SIM Access Profile Manager 242 also enables master to manage and modulate between a SIM profile according to SIM 212 and a SIM profile associated with the slave 250 such that master 202 may communicate with the network infrastructure appearing as itself or appearing as slave 250 by using the data accessed from the SIM of slave 250. Thus, in certain embodiments, master 202 takes on the role of client in a SIM Access Profile protocol, and slave 250 takes on the role of server. Master 202 accesses the data from the SIM of slave 250 and thereafter controls the SIM via a SIM access session over a short-range communication link until a disconnect is initiated by either master 202 or slave 250. When a disconnect of a SIM access session is requested, all connections with the network involving the SIM of slave 250 are disconnected before master 202 can disconnect from the SIM of slave 250. SIM Access Profile protocols and procedures relevant to the master-slave short-range communications will be discussed in more detail in conjunction with FIG. 4, infra.

By way of example, master 202 may comprise a single unit, such as a data communication device, a multiple-function communication device with data and voice communication capabilities, a personal digital assistant (PDA) enabled for wireless communication, or a computer incorporating an internal modem. Alternatively, master 202 may be a multiple-module unit comprising a plurality of separate components, including but in no way limited to a computer or other device connected to a wireless modem. In particular, the communication subsystem 210 may comprise a radio modem unit that may be inserted into a port on a laptop computer. In this case, the laptop computer would include display 220, keyboard 230, one or more auxiliary UIs 226, and microprocessor 208 embodied as the computer's CPU. It is also contemplated that a computer or other equipment not normally capable of wireless communication may be adapted to connect to and effectively assume control of components within the communication subsystem 210.

One such embodiment of the present disclosure may comprise master 202 incorporated as a laptop computer connected to a network and configured generally for data communication capabilities. Rather than modify the master laptop to accommodate voice communication, a slave short-range enabled device such as slave 250 having a SIM and a telephone number or a Session Initiation Protocol (SIP) Universal Resource Identifier (URI) associated therewith may be used in conjunction with the laptop computer. Slave 250 accordingly provides voice communication capabilities for the user of the master laptop using the network connection capabilities of the communication subsystem 210 to communicate with the wireless network. In some (wireless) networks, the (non-emergency) voice communication capabilities are provided subject to one or more indicators as discussed previously. Generally, a mobile device such as slave 250 supporting voice communication capabilities cannot provide these capabilities for non-emergency purposes if the network(s) it is using do not adequately support voice media.

Figure 3:
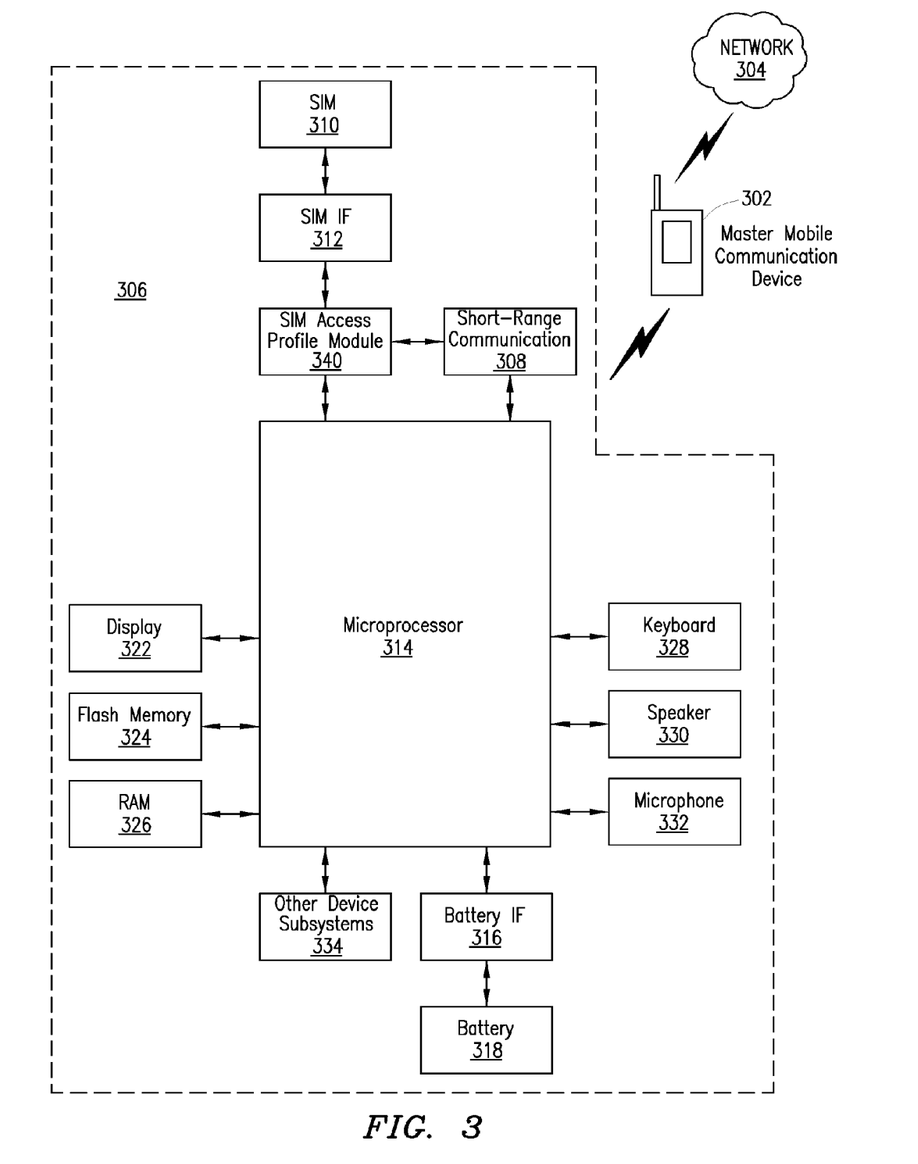
FIG. 3 is a diagram illustrating components of a slave short-range enabled communication device communicating with a master mobile communication device similar to the master mobile communication device of FIG. 2 and a wireless network according to one embodiment of the disclosure.

FIG. 3 is a diagram of a slave short-range enabled communication device 306 operable as slave 250 in FIG. 2 described hereinabove. In other words, slave device 306 may be an exemplary embodiment of slave 250. Slave device 306 may be a two-way communication device having at least voice communication capabilities. Depending on the functionality provided by slave device 306, it may be referred to as a data messaging device, a UE, a two-way pager, a cellular telephone, a wireless Internet appliance, or a data communication device. Slave device 306 is operably connected to a master mobile communication device 302, such as master 202 shown in FIG. 2, through a short-range communication subsystem 308. Slave device 306 may further utilize a communication subsystem (not shown in FIG. 3) resident on master 302 with components similar to those of communication subsystem 210 shown in FIG. 2 to communicate with a wireless network 304 such as in network infrastructure 104 shown in FIG. 1. Since slave device 306 is not encumbered with RF components suitable for wide area communications, its battery and form factor requirements can be less demanding, giving rise to a generally "light-weight" device.

Network access is generally associated with a subscriber or user of slave device 306 and therefore slave device 306 may operate using a Subscriber Identity Module (SIM) 310 which is connected to or inserted in slave device 306 at a SIM interface (IF) 312. SIM 310 is one type of a conventional "smart card" used to identify an end user (or subscriber) of slave device 306 and to personalize the device, among other things. In one embodiment, without SIM 310, slave device 306 may not be fully operational for communication through the wireless network. By inserting SIM 310 into slave device 306, an end user can have access to any and all of his/her subscribed services. SIM 310 generally includes a processor and memory for storing information. Since SIM 310 is coupled via SIM IF 312, it is accessible to microprocessor 314. In order to identify the subscriber, SIM 310 contains subscriber identity parameters such as an International Mobile Subscriber Identity (IMSI) or similar device identifier(s) and/or subscriber identifier(s) such as, e.g., International Mobile station Equipment Identity (IMEI) parameters, Electronic Serial Number (ESN) parameters, Mobile Identification Number (MIN) parameters, et cetera, that are associated with mobile communication devices depending on the wireless network technologies and protocols. SIM 310 may store additional user information for slave device 306 as well, including datebook (or calendar) information and recent call information.

Slave device 306 is generally a battery-powered device and therefore includes a battery IF 316 for receiving one or more rechargeable batteries 318. Such a battery 318 provides electrical power to most if not all electrical circuitry in slave device 306, and battery IF 316 provides for a mechanical and electrical connection for battery 318. The battery IF 316 is coupled to a regulator (not shown) which provides power to all of the circuitry. When slave device 306 is fully operational, a transmitter of short-range communication subsystem 308 is typically keyed or turned on only when communicating with the network, and is otherwise turned off to conserve resources.

Microprocessor 314 controls overall operation of slave device 306 whereas communication functions are performed through short-range communication subsystem 308. Additional device subsystems may also be provided as part of slave device 306 such as a display 322, a flash memory 324, a random access memory (RAM) 326, a keyboard 328, a speaker 330, a microphone 332, and any other device subsystems generally designated at 334. Keyboard 328, which may be a telephone type keypad or full alphanumeric keyboard, is normally provided for entering data for storage in slave device 306, information for transmission to network 304, a telephone number to place a telephone call, commands to be executed on slave device 306, and possibly other or different user inputs.

Slave device 306 sends communication signals to and receives communication signals from the wireless network by short-range communication with master 302 and thereafter utilizing transceiver circuitry of a communication subsystem of master 302 such as communication subsystem 210 shown in FIG. 2. Short-range communication subsystem 308 may comprise BLUETOOTH® or any other suitable short-range technology that can be implemented for purposes of the present patent disclosure. The short-range communication may be capable to convey AT commands (see e.g. 3GPP TS 27.007 or, for Short Message Service (SMS) AT commands, 3GPP TS 27.005).

A SIM Access Profile Module 340 enables master 302 to access subscriber identity data according to SIM 310 for use during transmission to and from network 304. Accordingly, master 302 may communicate with network 304 either as an intermediary for slave device 306 or appearing to the network directly as the slave device 306 utilizing data from SIM 310. As long as a SIM access connection is established between master 302 and slave device 306, master 302 may access and control SIM 310. If a SIM access connection is not active a SIM access session may be initiated on either the master 302 or the slave device 306. If a request is made to disconnect an active SIM access connection at the request of either slave device 306 or master 302, all connections with the network involving SIM 310 may be torn down.

Figure 4:
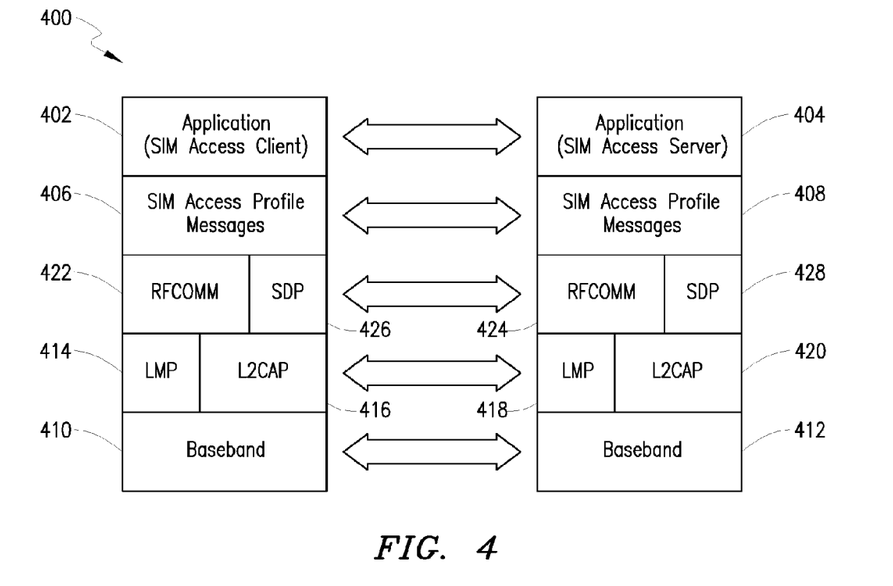
FIG. 4 illustrates protocols and entities which may be used in effectuating communication between a master mobile communication device and a slave short-range enabled communication device according to one embodiment.

FIG. 4 illustrates protocols and entities which may be used in a SIM Access Profile protocol communication stack 400 between a master mobile communication device having a SIM Access Client application 402, and a slave short-range enabled communication device having a SIM Access Server application 404. Both the client 402 and the server 404 exchange SIM data via SIM Access Profile Messages 406 and 408 and each comprise a SIM Access Profile software module. Communication between client 402 and server 404 may be effectuated via short-range communication technology such as BLUETOOTH® or any other suitable short-range technology that can be implemented for purposes of the present patent disclosure. The server 404 has direct access to its own SIM and assists the client 402 in accessing and controlling the SIM. Client 402 accesses and controls the SIM inside server 404 via the short-range communication link. In one embodiment of the present disclosure, a master mobile communication device such as master 202 may take on the role of client 402 and accesses and controls a SIM of a slave device such as slave device 306 having the role of server 404.

The client and server protocol stacks include, respectively, a Baseband layer 410 and 412, Link management protocol (LMP) 414 and 418 and Logical link control and adaptation protocol (L2CAP) layer 416 and 420, which are similar in function to the first two layers of a traditional Open System Interconnection (OSI) protocol stack. Further provided are Radio Frequency Communication (RFCOMM) layers 422 and 424 and Service Delivery Protocol (SDP) layers 426 and 428, which provide a reliable data stream between the client 402 and the server 404. RFCOMM layers 422 and 424 provides short-range serial port emulation entity and SDP layers 426 and 428 provide short-range Service Delivery Protocol.

Client 402 and server 404 exchange information by SIM Access profile messages 406 and 408. Each message generally comprises a message header and a payload. The message header comprises a message ID, number of parameters in the payload message, and a reserved field for future use. The payload contains message parameters according to the request or procedure performed between client 402 and server 404.

The RFCOMM layers 422 and 424 represent a simple set of transport protocols providing emulation of serial ports over the L2CAP layers 416 and 420, similar to L2CAP layers typically found in the data link layer of a typical OSI protocol stack. RFCOMM layers 422 and 424 and the SDP layers 426 and 428 work together to provide a reliable data stream between the master client 402 and the slave server 404.

In addition to the layers shown, several security measures such as those from the BLUETOOTH® specification may also be provided to ensure secure communication between the master client 402 and the slave server 404. These security measures include but are not limited to bonding of the client and server, an encrypted link between the client and server, server initiated authentication, link keys, a maximum length encryption key, and a passkey or personal information number. Further, the SIM Access Profile may comply with requirements of the BLUETOOTH® Generic Access Profile related to discovery of short-range enabled devices and link management aspects of connecting to short-range enabled devices.

The description of the overall network environment in FIG. 1, the architecture of master mobile communication device 202 from FIG. 2, the architecture of slave short-range enabled communication device 306 from FIG. 3, and the SIM Access Profile protocol stack 400 of FIG. 4 may be used according to one embodiment of the present patent application for the communication and transmission of data between the master mobile communication device, the short-range enabled device, and the network. In order to understand the communication processes described herein, reference is made to the flowcharts of FIGS. 5 through 7, which outline example embodiments described for purposes of the present patent application.

Figure 5:
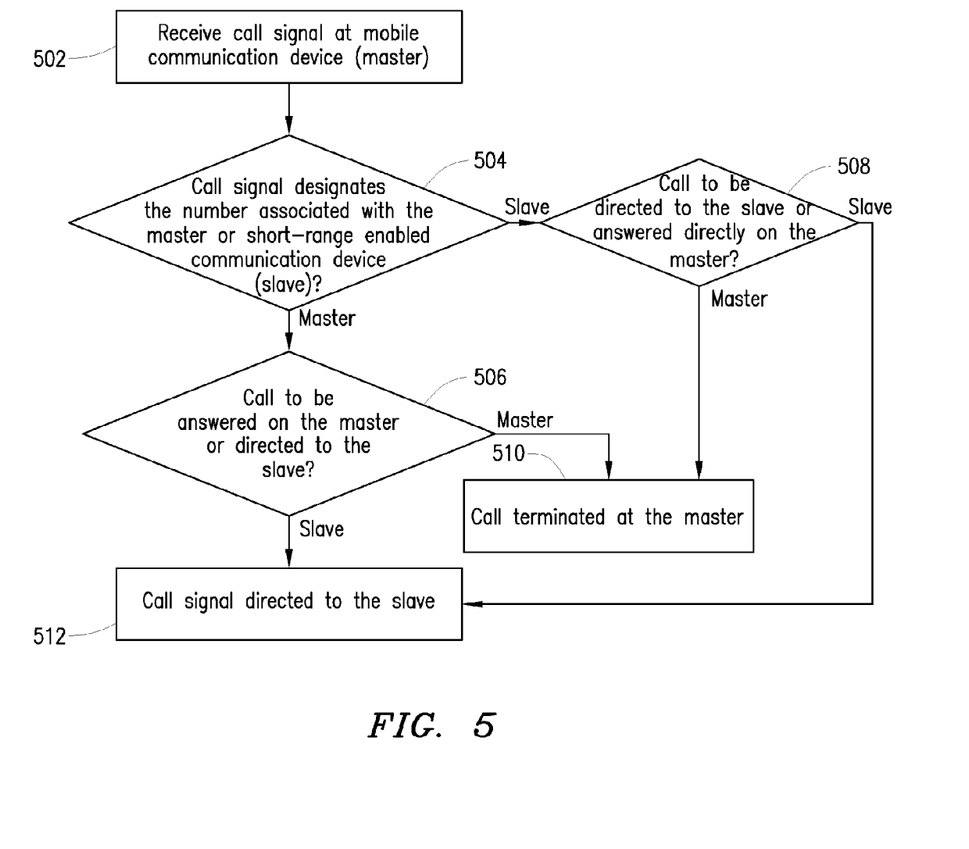
FIG. 5 is a flowchart illustrating one embodiment of a method of directing a call from a wireless network to a slave short-range enabled communication device according to one aspect of the present disclosure.

Referring now to FIG. 5, there is shown a flowchart of one embodiment of the present disclosure illustrating call termination to a slave short-range enabled device such as slave device 306. A calling party placing a call to a called party, the called party having a number associated with either the master mobile communication device or the slave short-range enabled device dials the number and transmits a signal to the calling party's serving mobile switching center (originating MSC). The originating MSC receives the (phone) number and uses provisioned logic resident thereon to set up an outgoing call leg to one or more gateway mobile switching centers. The outgoing call leg is eventually received at a terminating MSC serving a subscriber for both the master and slave device. The terminating MSC has provisioned logic thereon to receive and direct a call regardless of whether the number identified for the called party is associated with the master or the slave device. The terminating MSC thereafter directs the call to the master. The master receives the call (block 502) and then determines if the call signal designates the number associated with the master or with the subscriber identity information of the slave device (block 504). A SIM Access Profile manager incorporated on the master may utilize data resident on the master and data accessed from a SIM Access Profile module of the slave device to determine which device the call is directed to according to the number in the received call signal (block 504). The call may traverse PS networks. Since PS networks may not contain MSC and since PS networks may support the IMS or other VoIP network technology, other network elements than MSCs may be involved in the call.

If the call designates the number associated with the master, an option may be provided wherein the user may then select whether to answer the call directly on the master or forward the call the slave device for offering for termination thereon (block 506). The user may select from one or more options presented on a user interface of the master. For example, the user may input a command to automatically direct any received call designated for the slave device to the slave device, may input a command to automatically receive all calls on the master, may input a command designating a time period during which all calls are directed to the slave device, or may further designate a time window during which to answer all calls on the master, or any other combinations. Further the user interface may display information including, but not limited to, information regarding the calling party, the subject of a communication session, the called party number, and various other data which may be available and displayed for the received call signal. As will be understood by those skilled in the art, the options and user inputs may comprise various forms and options other than the foregoing examples provided. If the user selects to answer the call directly on the master the call is terminated on the master (block 510). If the user selects to forward the call to the slave device, the call signal is directed to the slave device for termination thereon (block 512).

If the number in the call signal designates the number associated with the slave device, an option may be provided wherein the user may determine whether to forward the call to the slave device or terminate the call directly on the master (block 508). If the user decides to answer the call directly on the master, the call is terminated directly on the master (block 510). If the user chooses not to answer the call directly on the master, the call is forwarded to the slave device (block 512). Accordingly, the same options presented for calls to the number associated with the master may also be available for a user to select from for calls wherein the called party number is associated with the slave device.

Figure 6:
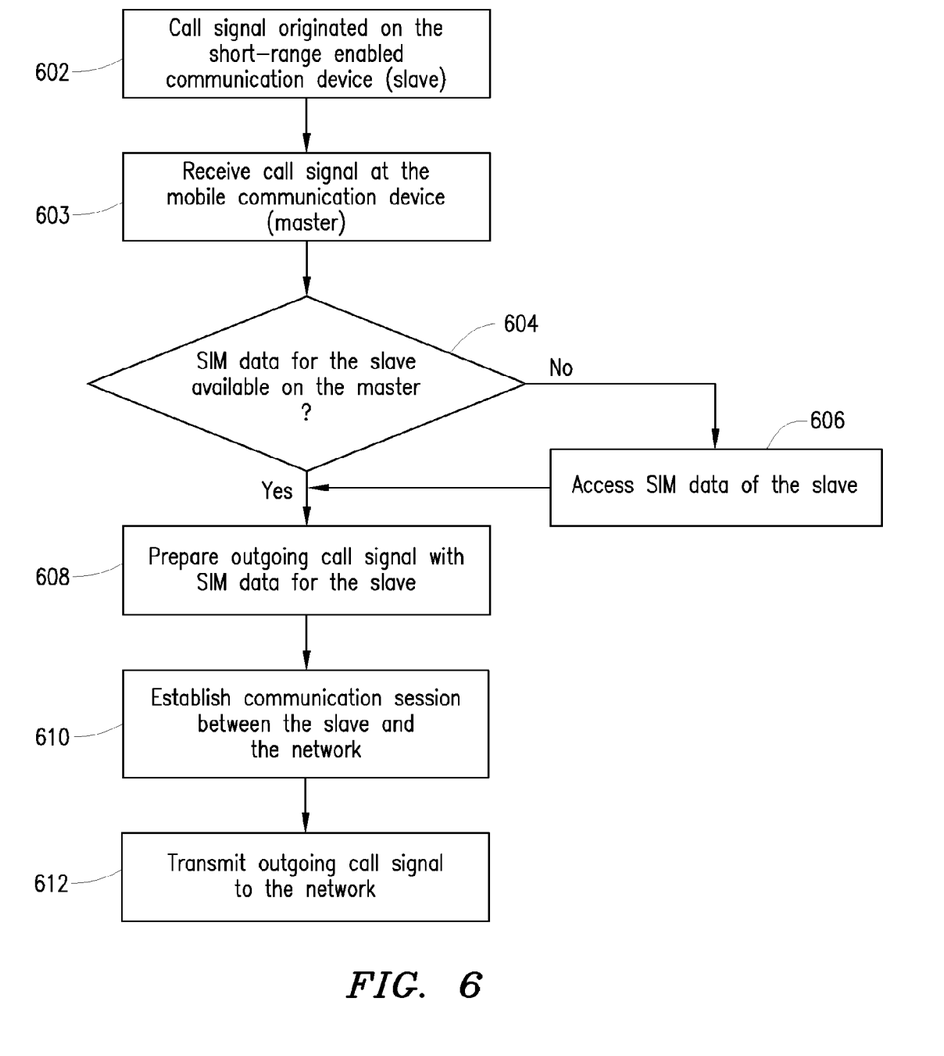
FIG. 6 is a flowchart illustrating one embodiment of a method of directing a call to a wireless network from a slave short-range enabled communication device.

FIG. 6 shows a flowchart of one embodiment of the present disclosure illustrating a call originating on a slave short-range enabled device such as slave device 306. The slave device may inspect an indicator indicating if the network the master device is using supports voice media or CS media. The indicator indicating if the network the master device is using supports voice media or CS media may be provided by an AT command, indicating the availability of BLUETOOTH® profile suitable for media involving codecs suitable for voice, or otherwise. Voice media involve audio codecs suitable for voice. The slave device originates a call signal to a called party (block 602) and sends the signal to a master mobile communication device via a short-range communication link. The master receives the call (block 603) and the SIM Access Profile manager 242 verifies whether the network supports voice media or CS media, and whether a SIM access connection is active between the master and slave device for the master to access data for the slave device SIM (block 604). The call originating on a slave short-range enabled device may involve instruction messages, e.g. AT command messages such as ITU T Recommendation V.250 dial command "D". An instruction command message may also convey the calling party's number or SIP URI, for example when using IMS a UE may have multiple "identities" represented by multiple SIP URIs or Tel URIs, to choose from. If support for voice media or CS media is absent, the AT command may fail. The failure of the AT command may include an indication for reason of failure, for example the reason of failure may be that the network does not adequately support voice media or CS media. Alternatively, the failure may indicate the master is not registered with a network supporting voice services. For example, the master isn't registered (e.g. using a SIP REGISTER request message) with the IMS or the master isn't registered for non-EPS services. If a SIM access connection is active and the SIM data for the slave device is available, the master prepares an outgoing call signal with the SIM data for the slave device attached (block 608). If a SIM access connection is not active and the SIM data for the slave device is not available, the master initiates a SIM access session with the slave device to access the SIM data for the slave device (block 606) before preparing an outgoing call signal (block 608). The master thereafter establishes a communication session between the wireless network and the slave device using transceiver circuitry incorporated into a communication subsystem of the master and a short-range communication link between the master and the slave device (block 610). The outgoing call signal is thereafter transmitted to the network (block 612) for eventual termination at the called party.

Figure 7:
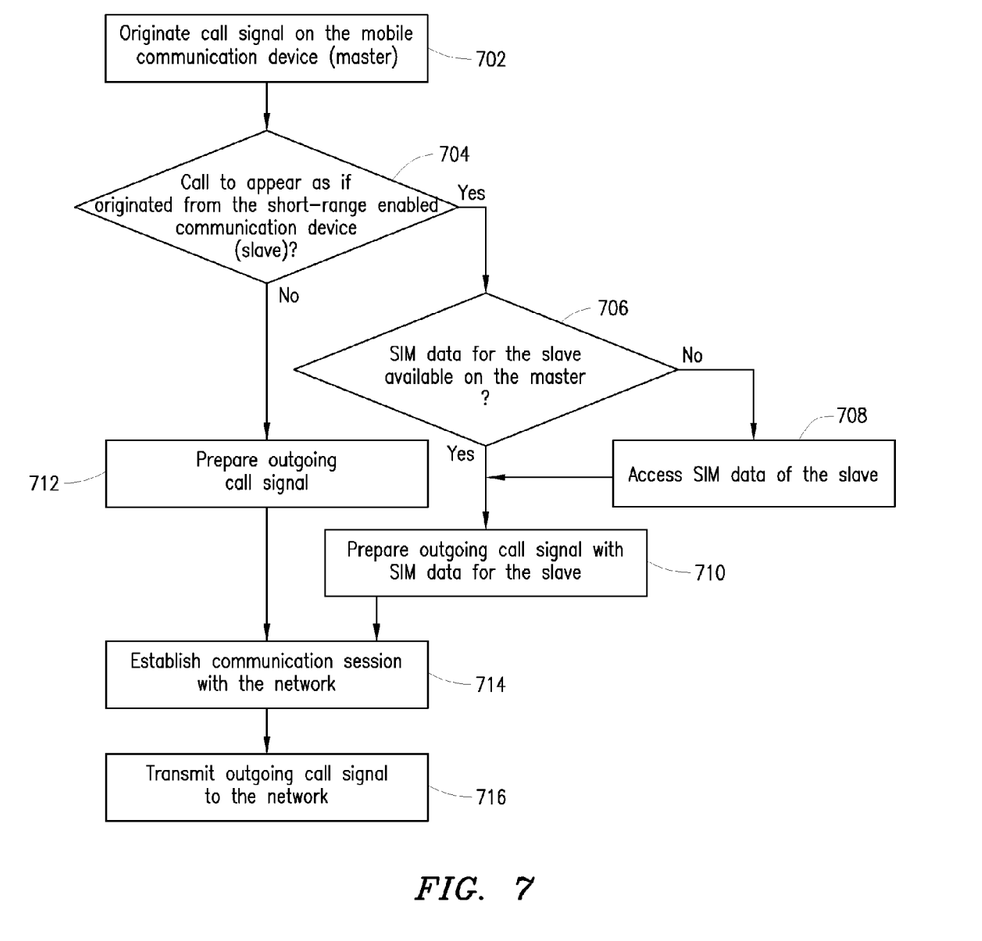
FIG. 7 is a flowchart illustrating another embodiment of a method of directing a call to a wireless network from a slave short-range enabled communication device.

Referring now to FIG. 7, there is shown a flowchart of one embodiment of the present disclosure illustrating a call originating on a master mobile communication device such as master mobile communication device 202. A user of the master originates a call signal on the master (block 702). When originating the call the user may select an option for the call to appear as if originated from the slave device or for the call to be changed to the slave SIM profile (block 704). If the call is to appear as if originated on the slave device, the master requires the SIM data for the slave device and an active SIM access session between the master and the slave device (block 706). If the SIM data is not available and a SIM access session is not active, the master initiates a SIM access session with the slave device to access the SIM data for the slave device (block 708). Once the SIM data is available on the master and a SIM access session is active, the master thereafter prepares an outgoing call signal with the SIM data for the slave device (block 710). A communication session is thereafter established with the network (block 714) and the call signal is transmitted to the network (block 716). If the call is not to appear as if originated from the slave device, the master prepares an outgoing call signal with data from the master SIM (block 712), establishes a communication session with the network (block 714), and transmits the outgoing call signal to the network (block 716) for eventual termination at a called party.

While the foregoing description in conjunction with FIGS. 5 through 7 relates to a voice call, the present disclosure may also apply to data transmissions. One embodiment may comprise originating a data transmission such as, e.g., an e-mail from the master having data transmission capabilities while the slave device has only voice transmission capabilities. As such, the user of the slave device is able to send data transmissions from the master appearing as the slave device and attributed to an account with the network associated with the SIM of the slave device. Likewise, the user of the slave device is able to receive data transmissions without the slave device having the hardware or software requirements thereon to handle such data transmissions. By utilizing data transmission capabilities of the master and transceiver circuitry within a communication subsystem of the master, the user of the slave device is able to expand the communication capabilities of the slave device without expanding the hardware or software requirements thereof.

Further, it will be understood by those skilled in the art that any calls described in the examples of FIGS. 5 through 7 may be either circuit-switched calls or packet switched calls over suitable networks. Accordingly, the subscriber identity module data of either the master or slave device may comprise an E.164 number as well as uniform resource identifiers (URIs) such as SIP URI or Tel URI.

If one or more calls or SIP request messages may be received or originated using the IMS from device at a network address, the device needs to be registered with the IMS. For example, a device can be registered with the IMS using SIP REGISTER request messages, received by a node in a PS network supporting the IMS. The processing of the SIP REGISTER request message by the node has the effect of binding one or more SIP URIs with the network address. The SIM Access Profile manager may need access to the ISIM application on the UICC in the master or slave, prior to sending the SIP REGISTER request message.

Note that the use of "master"/"slave" and "client"/"server" terminology are used for mere illustrative purposes and that the two user devices may also be used in a peer-to-peer relationship. Further, one skilled in the art will recognize that the terms "master", "slave", "client", and "server" are intended as non-limiting and may be applied with various technologies and device relationships.

The embodiments shown and discussed in conjunction with the foregoing disclosure generally relate to a configuration of a single master mobile communication device affiliated with a slave short-range enabled device. Another embodiment of the disclosure may comprise multiple slave devices, each having SIM cards thereon, which may all be operably connected with the single master device. The master device may have its own SIM card and identity profile for identification with a wireless network; however, as it will be understood by those skilled in the art, the master device may be operable without a SIM card or profile. Further, one or more of the slave devices may be operably connected to more than one master.

Additionally, it will be further recognized by those skilled in the art upon reference hereto that the arrangements set forth in the Figures of the present application may comprise a number of variations and modifications, in hardware, software, firmware, or in any combination involving suitable computer-readable media, usually in association with a processing system where needed, as components configured to perform specific functions. Accordingly, the arrangements of the Figures should be taken as illustrative rather than limiting with respect to the embodiments of the present patent application.

It is believed that the operation and construction of the embodiments of the present patent application will be apparent from the Detailed Description set forth above. While the embodiments shown and described may have been characterized as being exemplary, it should be readily understood that various changes and modifications could be made therein without departing from the scope of the present disclosure as set forth in the following claims.

What is claimed is:

1. A mobile communication device comprising:
    a first communication subsystem communicating with a wireless network;
    a second communication subsystem communicating with a first communication device comprising a first subscriber identity module having a first subscriber identity data associated therewith; and
    a processor communicably connected to the first communication subsystem and to the second communication subsystem; and
    a memory storing computer program instructions, which, when executed by the processor, cause the processor to perform operations comprising:
        establishing a communication session between the wireless network and the first communication device while appearing to the wireless network directly as a short-range enabled communication device in response to:
            receiving a call signal originating on the first communication device operably connected to the mobile communication device via the second communication subsystem; and
            determining that the first subscriber identity data is available and accessed by the mobile communication device from the first subscriber identity module.

2. The mobile communication device according to claim 1, wherein the subscriber identity data is accessed from one of a Universal Integrated Circuit Card (UICC), and a Removable User Identity Module (R-UIM) attached to the first communication device.

3. The mobile communication device according to claim 1 further comprising a second subscriber identity module directly associated therewith.

4. The mobile communication device according to claim 3 wherein the first communication subsystem comprises a first radio frequency (RF) transceiver adapted for communication associated with the second subscriber identity module associated with the mobile communication device and a second radio RF transceiver adapted for communication associated with the first subscriber identity module associated with the first communication device.

5. The mobile communication device according to claim 1 wherein the operations further comprising:
    initiating and maintaining a subscriber identity data access session between the mobile communication device and the mobile communication device.

6. The mobile communication device according to claim 1 wherein the first communication subsystem is configured to operate with one of a General Packet Radio Service (GPRS) network, an Enhanced Data Rates for Global System for Mobile Communication (GSM) Evolution (EDGE) network, a 3rd Generation (3G) network, an Integrated Digital Enhanced Network (IDEN), a Code Division Multiple Access (CDMA) network, and a Universal Mobile Telecommunication System (UMTS) network.

7. The mobile communication device of claim 1, wherein the operations further comprising verifying whether the wireless network supports voice media.

8. The mobile communication device of claim 7, wherein the operations further comprising:
    in response to verifying that the wireless network does not support voice media, generating an indication of a reason for failing to generate an instruction command, wherein the reason for failing to generate an instruction command is a failure by the wireless network to support voice media.

9. The mobile communication device of claim 1, wherein the operations further comprising:
    determining whether the first subscriber identity data is available on the mobile communication device by determining whether a subscriber identity module access session is active between the mobile communication device and the first communication device.

10. A method comprising:
    receiving, at a mobile communication device, a call signal originating on a first communication device comprising a first subscriber identity module having a first subscriber identity data associated therewith, wherein the first communication device is operably connected to the mobile communication device; and
    establishing, via a first communication subsystem, a communication session between a wireless network and the first communication device while appearing to the wireless network directly as a short-range enabled communication device in response to determining that the first subscriber identity data is available and accessed by the mobile communication device from the first subscriber identity module.

11. The method of claim 10, wherein the call signal is received via a second communication subsystem communicating with the first communication device.

12. The method of claim 10, further comprising initiating and maintaining a subscriber identity data access session between the mobile communication device and the mobile communication device.

13. The method of claim 10, further comprising verifying whether the wireless network supports voice media.

14. The method of claim 13, further comprising:
in response to verifying that the wireless network does not support voice media, generating an indication of a reason for failing to generate an instruction command, wherein the reason for failing to generate an instruction command is a failure by the wireless network to support voice media.

15. The method of claim 10, further comprising:
determining whether the first subscriber identity data is available on the mobile communication device by determining whether a subscriber identity module access session is active between the mobile communication device and the first communication device.

16. A non-transitory computer readable medium storing computer program instructions, which when executed by a processor, cause the processor to perform operations comprising:
receiving, at a mobile communication device, a call signal originating on a first communication device comprising a first subscriber identity module having a first subscriber identity data associated therewith and operably connected to the mobile communication device; and
establishing a communication session between a wireless network and the first communication device while appearing to the wireless network directly as a short-range enabled communication device in response to determining that the first subscriber identity data is available and accessed by the mobile communication device from the first subscriber identity module.

17. The non-transitory computer readable medium of claim 16, wherein the wireless network is communicating with a first communication subsystem.

18. The non-transitory computer readable medium of claim 16, wherein the call signal is received via a second communication subsystem communicating with the first communication device.

19. The non-transitory computer readable medium of claim 16, the operations further comprising:
initiating and maintaining a subscriber identity data access session between the mobile communication device and the mobile communication device.

20. The non-transitory computer readable medium of claim 16, the operations further comprising:
determining whether the first subscriber identity data is available on the mobile communication device by determining whether a subscriber identity module access session is active between the mobile communication device and the first communication device.

* * * * *